Oct. 21, 1969    V. J. NARDOZZA    3,474,450
RADIO DIRECTION FINDER HISTOGRAM PROCESSING SYSTEM
Filed Aug. 1, 1968    2 Sheets-Sheet 2
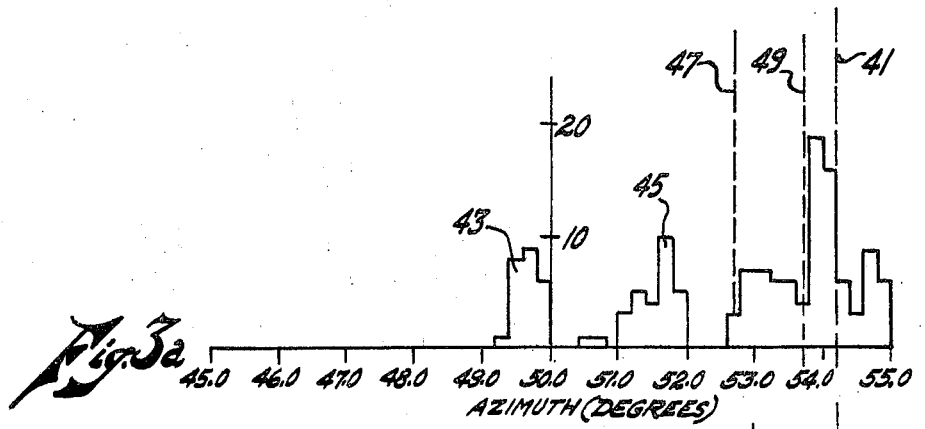
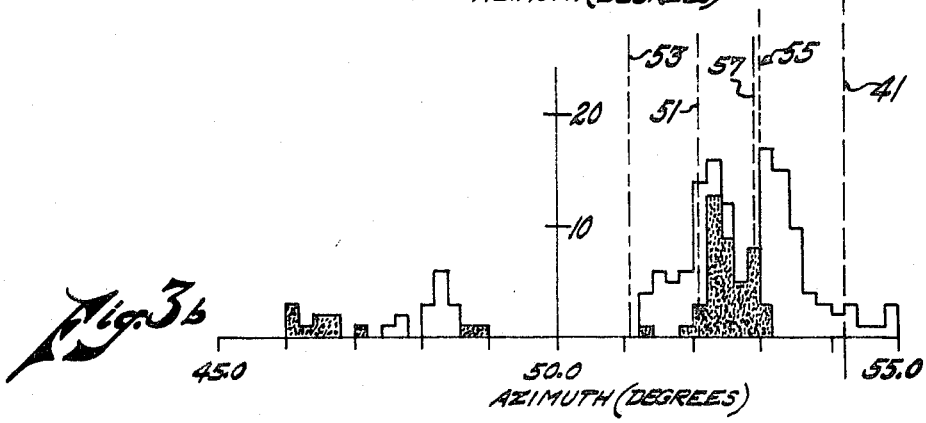
VINCENT J. NARDOZZA
Harry A. Herbert Jr
Julian L. Siegel and
ATTORNEYS

# United States Patent Office 3,474,450
Patented Oct. 21, 1969

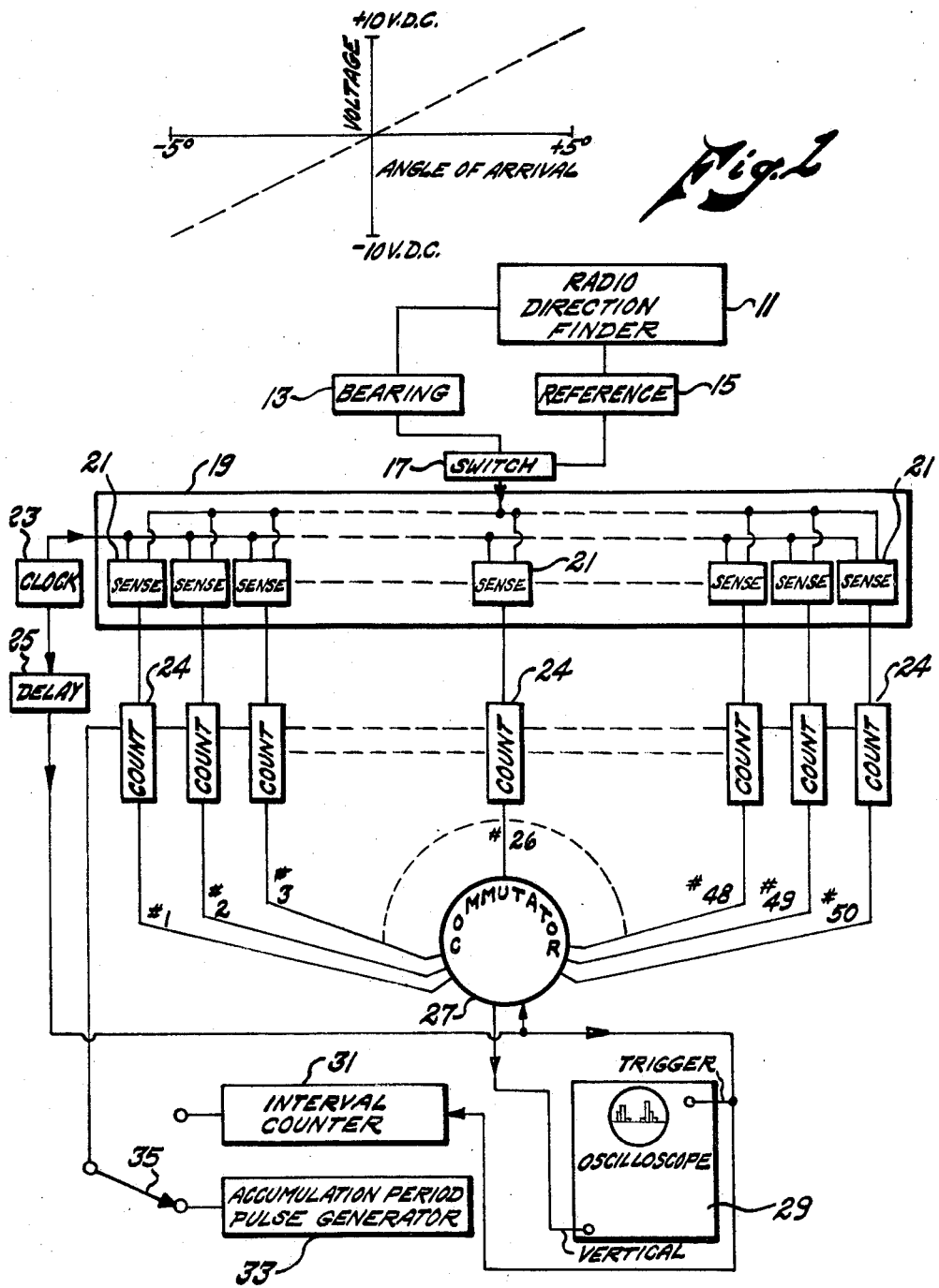

3,474,450
RADIO DIRECTION FINDER HISTOGRAM PROCESSING SYSTEM
Vincent J. Nardozza, Rome, N.Y., assignor to the United States of America as represented by the Secretary of the Air Force
Filed Aug. 1, 1968, Ser. No. 749,460
Int. Cl. G01s 5/02
U.S. Cl. 343—113                                                4 Claims

ABSTRACT OF THE DISCLOSURE

A display system for a radio direction finder having a bearing dependent voltage output upon receipt of a signal which is fed into a network of gated voltage level sensors which are then fed into a series of counters that are read out by a commutator and displayed as a histogram on a cathode-ray tube oscilloscope.

BACKGROUND OF THE INVENTION

This invention relates to a radio direction finder system and more particularly to a system that displays azimuth readings in the form of a histogram.

The present invention provides an added dimension in which to evaluate the angle of arrival of electromagnetic energy intercepted by a direction finder system which is displayed on an oscilloscope in the form of a histogram. A histogram is a series of rectangles of equal width corresponding to equal-class intervals and having a height proportional to the relative frequency of occurrences.

Conventional phase, amplitude, and phase amplitude systems rely on time aperture averaging methods to resolve the unstable arrival angles of intercepted signals to determine the bearing of their emitters.

This invention provides convenient access to a display of the distribution and growth rate of repetitive direction finder measurements which yield added information upon which an evaluation of the emitters' true bearing can be made, or upon which the validity of time averaged measurements can be assessed.

The propagation media and local topography are often responsible for deviation in the arrival angle of electromagnetic energy transmitted from one point to another. This is especially true of high frequency skywave signals whose propagation paths are continually influenced by ionospheric variations, as well as the terrain features in the vicinity of a direction finder system attempting to measure their angles of arrival. Since the ultimate objective of a direction finder system is to determine the bearing of an emitter from the arrival angle of its radiated energy, the various observed arrival angles must be resolved to a single value which most likely represents the true bearing of the emitter.

Without the aid of sophisticated recording and computer subsystems, direction finder systems in the past have had to rely upon aperture averaging, time averaging and signal strength as the criteria for determining emitter bearing from unstable repetitive measuremeints of arrival angle.

The present invention provides the added criteria of measurement distribution upon which the determination of emitter bearing can be made and provides the direction finder console operators with an enhanced capability to rapidly identify wild or spurious bearings, zones of re-radiation and dominant arrival angles (characteristics which normally tend to bias, or which are masked by the conventional direction finder processing display techniques) through the visual inspection of the distribution and growth rate of discrete direction finder measurements.

SUMMARY OF THE INVENTION

This invention presents a real time series of discrete radio direction finder measurements in the form of a histogram whose envelope represents the cumulative distribution of those measurements made within a selectable time period. In addition to showing the distribution of measurements, an appropriately scanned visual display (cathode-ray tube oscilloscope) of the histogram has an inherent advantage of showing the growth rate or time synthesis of the repetitive direction finder measurements. The present invention has application to any radio direction finder system in which the measured angle of arrival can be represented as a bearing dependent voltage upon receipt of a signal. This voltage is applied to a series of exclusive gates whose input voltage limits are established by the azimuthal resolution (direction finder accuracy) of the radio direction finder system or the desired display resolution. Associated with each gate is a cumulative event counter which registers each direction finder measurement that falls within the limits of its gate. The number of gate-counter channels required is directly related to the direction finder resolution required and the azimuthal sector over which it is desired to display the distribution of measurements. The rate at which the direction finder measurements are sampled by the array of gate-counter channels is selectable (limited by the fundamental time constant of the direction finder system) while the accumulation period, or time interval over which the counters are allowed to accumulate events before being reset, can be determined by a selectable time interval (clock) or by the number of events accumulated (counter).

It is therefore an object of the invention to provide a novel radio direction finder display system.

It is another object to provide a radio direction finder system that allows console operators to identify spurious bearing.

It is still another object to provide a radio direction finder system that provides a display in the form of a histogram.

These and other objects, advantages and features of the invention will become more apparent from the following description taken in connection with the illustrative embodiment in the accompanying drawings, wherein:

BRIEF DESCRIPTION OF THE DRAWINGS

FIGURE 1 is a diagram showing the relationship between voltage and azimuth;

FIGURE 2 is a block diagram showing an embodiment of the invention, and

FIGURES 3a and 3b show examples of histogram displays appearing on a cathode-ray oscilloscope.

DESCRIPTION OF THE PREFERRED EMBODIMENT

This invention can be incorporated into any direction finder or bearing measurement system in which the measured angle of arrival can be represented as a bearing dependent voltage upon receipt of a signal. It is uniquely suited for high frequency direction finder systems to complement their existing readout or display consoles. The cumulative distribution can be presented on an existing direction finder system display on a time share basis, on a "call-up" basis, or continuously on a separate display.

The track console of a direction finder system, such as the High Frequency Luneberg Lens Direction Finder (HFLLDF), can have an auxiliary output which represents the measured angle of arrival of an intercepted signal within any 10° azimuthal sector as a linear voltage from −10.0 v. DC to +10.0 v. DC. Since the 10° sectors are centered at multiples of 10° in azimuth, the above voltage range represents 5° from the sector centers. The relationship is shown in FIGURE 1. Since the measured resolution of the system which is explained as an example is on the order of 0.25°, a 20° interval is chosen for the resolution of the elements of the displayed histogram. That is, +.4 v. DC=+.20°, −2.0 v. DC=−1.0°, etc.

Referring to FIGURE 2, direction finder system bearing dependent voltage source 13 is fed into gated voltage distribution network 19 which samples the directional finding voltage at a fixed clock rate. In the case explained, 50 level sensors collectively denoted as 21 of distribution network 19 are calibrated to pass voltages within the .20 v. DC range (−10.0 to −9.8, −9.8 to −9.6, −9.6 to −9.4 . . . +9.6 to +9.8, +9.8 to +10.0). Each time the direction finder system bearing dependent voltage is gated by clock 23 into distribution network 19 only one level sensor is activated to increment one of the 50 cumulative counters collectively denoted as 24. After a counter 24 is incremented, a pulse from clock 23 via delay 25 initiates a scan cycle of commutator 27 which samples the outputs (number 1, number 2, etc.) of each of the 50 cumulative counters 24. The same pulse triggers the horizontal sweep of cathode-ray oscilloscopes 29 whose vertical input voltage is derived from the output voltage of commutator 27. Such a commutator is commercially available, for example, the model manufactured by Smyth Research Associates, Model CLK–1.

The accumulation period can be determined by the time interval between the successive pulses of a variable pulse repetition frequency of pulse generator 33 which simultaneously resets all cumulative counters 24. By activating switch 35, the accumulation period can be controlled by interval counter 31 which initiates a reset voltage after a predetermined number of accumulated events, the accumulated events being the direction finder measurements.

In the case where this invention is used to display, a sector of a continuously scanned (360°) radio direction finder system, the sample rate of gated voltage distribution network 19 can be determined by a marker pulse generated by reference marker 15 derived from radio direction finder 11. This pulse, whose leading and trailing edges respectively, identifies the beginning and end of the sector of interest. Through the incorporation of switch 17, which can be a diode switch, this pulse is applied to inhibit the passage of bearing dependent voltages to voltage distribution network 19 during those portions of the radio direction finder scan which are not within the sector of interest.

In FIGURES 3a and 3b there are shown three synthesized displays of a 10° scan between 45° and 55° of the histogram of the direction finder measurements made from recorded data of an HFLLDF. The abscissa represents azimuth in degrees and the ordinate represents a count of cumulative events. These measurements were made on a BBC transmitter at 21.610 mHz. The calculated great circle bearing of the transmitter was 54° 13 min. (about 54.2°) which is shown at 41.

FIGURE 3a shows two areas of accumulated measurements between 49° and 50° and between 51° and 52° as minor lobes 43 and 45. These lobes tend to bias the average of the direction finder measurements away from the true bearing of 41, giving a result of 52.8° shown at 47, thus having a 1.2° error. By not using these spurious readings which are readily shown on the display, the histogram then indicates a bearing of 53.8° at 49 or approximately 0.4° error. The histogram displays shows an improvement over conventional time averaging by 1.0°. Minor lobes 43 and 45 to the left of the display indicate the time average of the direction finder are biased to the left of the true bearing. The proportionally larger main lobe strongly suggests an arrival angle much closer to the true bearing than the average of all direction finder measurements indicated.

FIGURE 3b shows a two second and seven second histogram display and their associated time averages of the measurements. The stippled areas represent the two second display. For the case of the two second period the histogram indicated a bearing shown at 51 and having an error of 2° which was an improvement of 1° over the standard two second time average shown at 53. In the case of the seven second period, the average from the histogram method is shown at 55 and is in error by 1.2°, having less than of .2° improvement over the seven second average shown at 57. After two seconds of accumulation, the lack of a significant main lobe of the histogram indicates insufficient data to make a judgment of bearing. If a judgment were made on the basis of the histogram alone, however, it would still be better than forming a determination from the time averaged measurements. At the end of seven seconds a definite main lobe is apparent, and the left bias of the average by the minor lobes between 46° and 49° is apparent. The main lobe of the histogram tends to confirm the accuracy of the seven second average. Though still in error, the improvement is obvious.

Although the invention has been described with reference to a particular embodiment, it will be understood to those skilled in the art that the invention is capable of a variety of alternative embodiments within the spirit and scope of the appended claims.

I claim:
1. A radio direction finder display system comprising:
   (a) a radio direction finder having a bearing dependent voltage output upon receipt of a signal;
   (b) a gated voltage distribution network fed by the bearing dependent voltage output, the network including a multiplicity of gated voltage level sensors sensitive to a continuous sequence of voltage levels;
   (c) a clock fed to the voltage level sensors for the gating thereof;
   (d) a multiplicity of cumulative event counters having reset terminals and fed by one each of the voltage level sensors;
   (e) a commutator readout means having a scan cycle triggered by the clock and fed by the counters for the sequential sampling thereof; and
   (f) an oscilloscope having a horizontal input triggered by the clock and a vertical input fed by the commutator.

2. A radio direction finder display system according to claim 1 which further comprises an interval counter interposed between the clock and the reset terminals of the cumulative events counters for the resetting thereof after a predetermined count.

3. A radio direction finder display system according to claim 1 which further comprises a pulse generator fed to the reset terminals of the cumulative events counter for the periodic resetting thereof.

4. A radio direction finder display system according to claim 1 which further comprises:
   (a) a second output from the radio direction finder, the second output being a reference sector marker pulse; and
   (b) a switch interposed between the bearing dependent voltage output and the gated voltage distribution network, the switch being activated by the second output.

References Cited
UNITED STATES PATENTS 2,489,263  11/1949  Busignies _____ 343—118
2,953,020  9/1960   Hunt.

RODNEY D. BENNETT, JR., Primary Examiner

RICHARD E. BERGER, Assistant Examiner

U.S. Cl. X.R.

343—118